March 11, 1941.  J. D. KENNELLY  2,234,600
HEADLIGHT
Filed Dec. 30, 1937  3 Sheets-Sheet 1

Inventor:
Jeremiah D. Kennelly,
By: Frank J. Foley
Attorney.

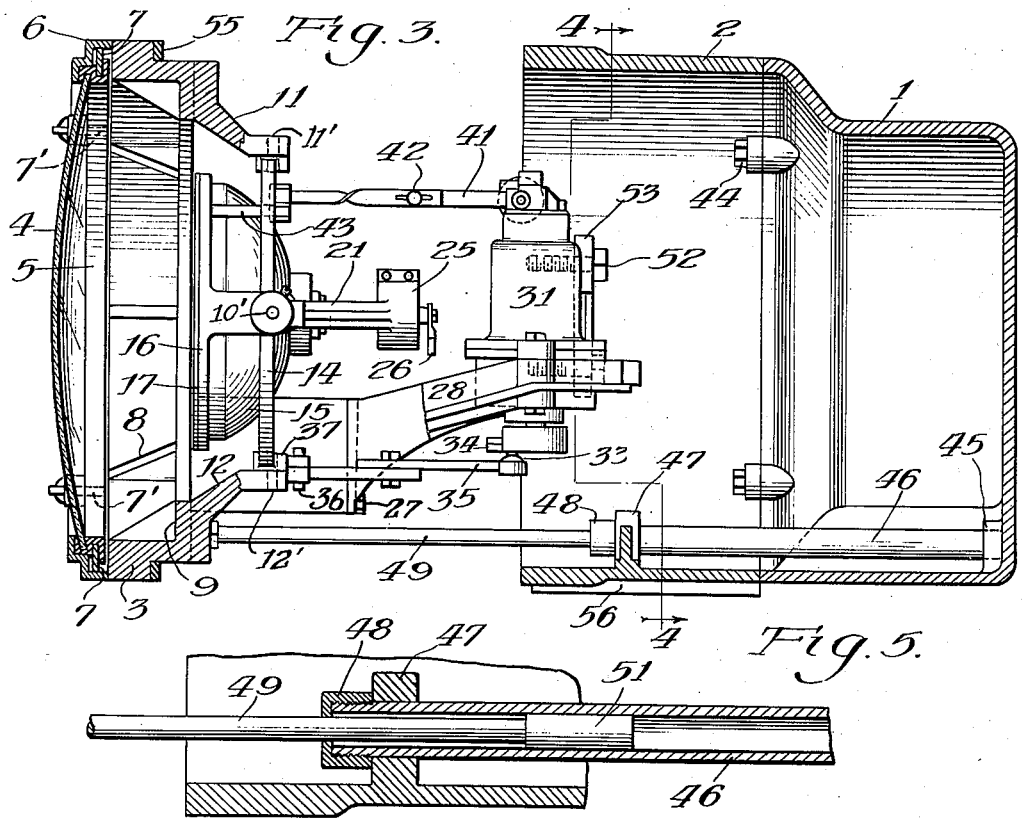

March 11, 1941.  J. D. KENNELLY  2,234,600
HEADLIGHT
Filed Dec. 30, 1937  3 Sheets-Sheet 3

Inventor:
Jeremiah D. Kennelly,
By: Frank J. Foley
Attorney.

Patented Mar. 11, 1941

2,234,600

UNITED STATES PATENT OFFICE 2,234,600

HEADLIGHT

Jeremiah D. Kennelly, Oak Park, Ill.

Application December 30, 1937, Serial No. 182,526

9 Claims. (Cl. 240—48)

This invention relates to headlights for vehicles and particularly to a new type of headlight in which the light beam is caused to move, continuously if desired, by means of a motor or other motive force.

This invention is particularly useful as a warning signal light in locomotives and when so used its powerful light beam is caused to sweep rapidly back and forth to the right and left of the right of way far ahead of the locomotive, flashing a warning to motorists and other persons of the approach of the locomotive. The rapid and vigorous motion of the beam causes it to stand out prominently among the numerous stationary or fixed beam lights which so often are competing with each other for attention and contributing to the confusion of the night traveling public.

The general object of the invention is to provide an apparatus which will produce a continuously moving light beam and suitably constructed for dependable operation.

Another object of the invention is to provide an apparatus which is capable of adjustment to produce various different motions for the light beam to suit the requirements of different installations.

Another advantage of the invention herein illustrated is found in the particular structure which provides a weatherproof device yet affording easy accessibility to the operating parts thereof when service or repair is necessary.

Another object of the invention is to provide in a headlight of this character a structure which is easily and accurately assembled and thoroughly dependable in operation.

Various other objects and advantages of the invention will be alluded to specifically or will become apparent upon a perusal of the following specification.

In the drawings I have illustrated a form of headlight suitable for mounting upon a locomotive or any other vehicle.

Fig. 3 is a longitudinal sectional view of the headlight shown in Fig. 1, showing the front section and operating mechanism of the headlight partially withdrawn from the casing;

Fig. 4 is a sectional view on the line 4—4 of Fig. 3;

Fig. 5 is a detail view in section of the sliding support for the reflector operating mechanism and associated parts;

Figure 1:
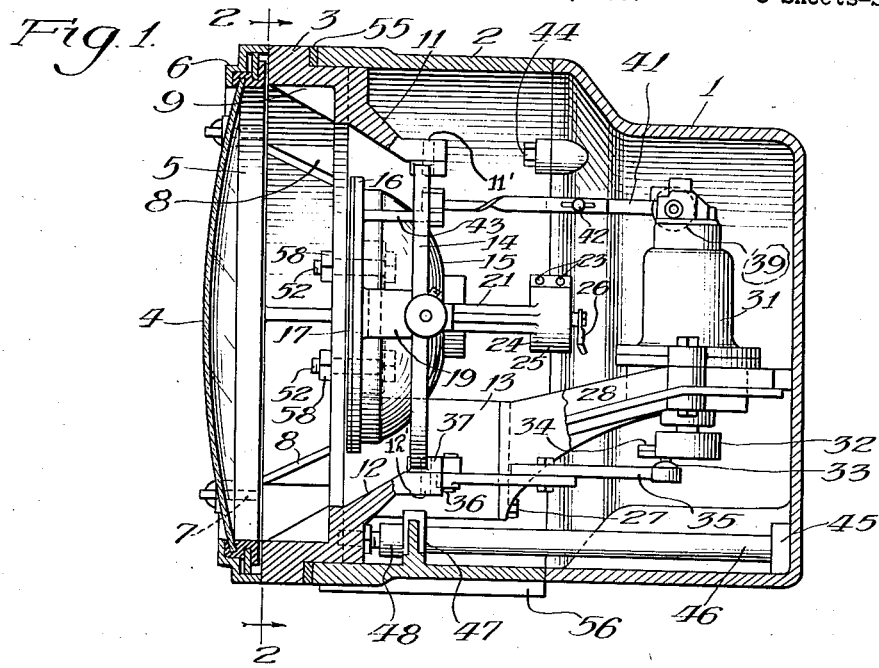
Figure 1 is a longitudinal sectional view with portions in elevation of a headlight made in accordance with this invention.
Figure 2:
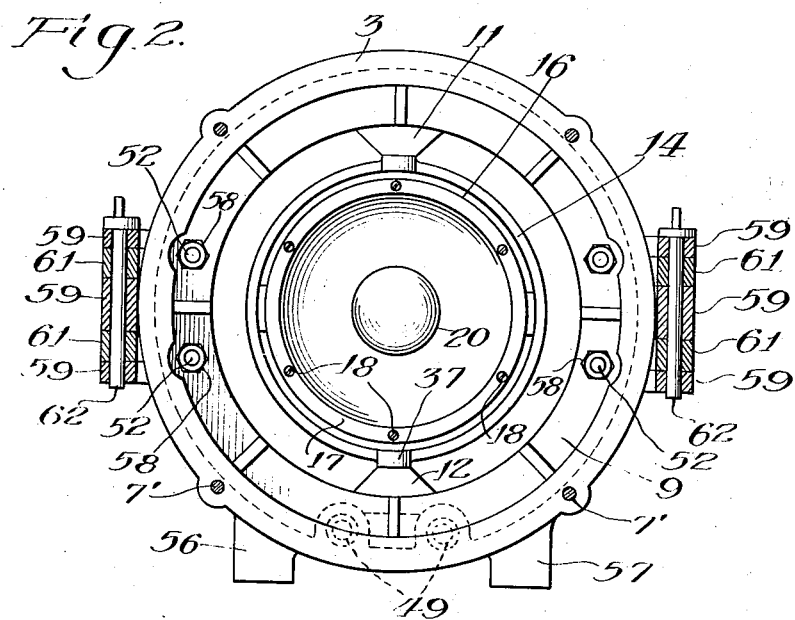
Fig. 2 is a sectional view on the line 2—2 of Fig. 1.
Figure 6:
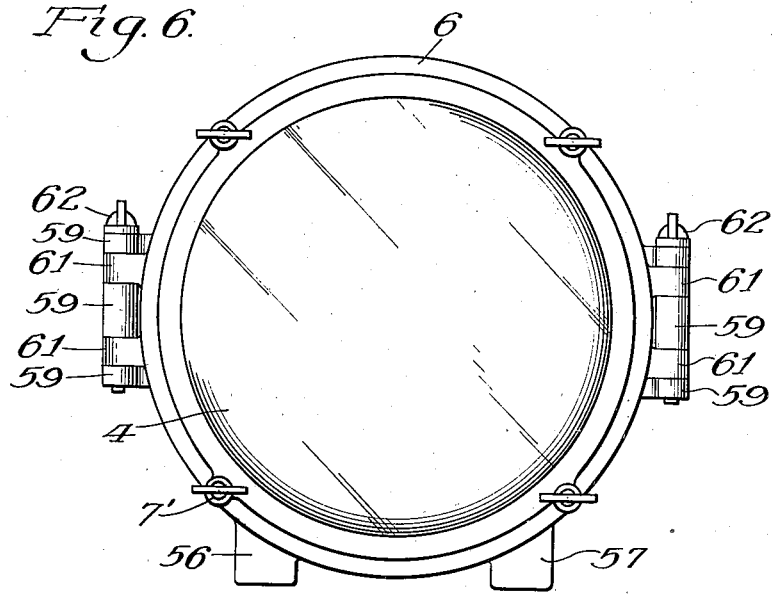
Fig. 6 is a front elevation of the device shown in Fig. 1.
Figure 7:
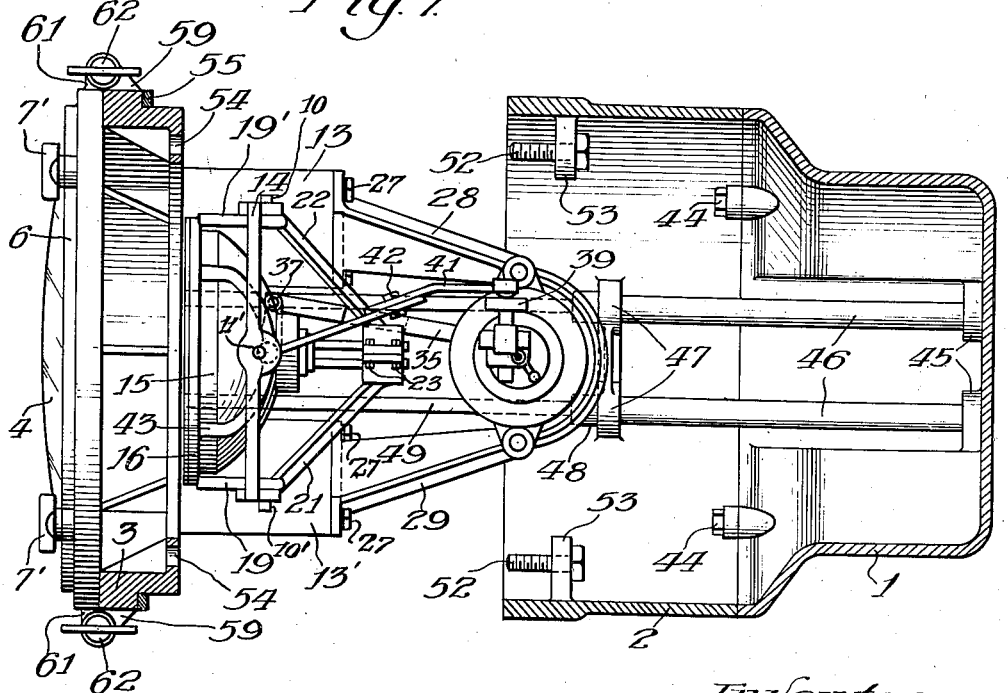
Fig. 7 is a horizontal sectional view of the headlight shown in Fig. 1, showing the operating mechanism in plan view.

Referring now to the drawings, the housing for the light consists preferably of a rear section 1 and an intermediate section 2. Adjoining the front open end of section 2 is an annular frame member 3 which supports the lens 4 and the light beam projector and the operating mechanism therefor.

The lens preferably has its edges cushioned in a resilient annulus such as 5 made of rubber or other suitable resilient material which is snugly fitted in any suitable manner in a metal collar 6 and held therein by a retaining ring 7.

The annular member 3 is shaped, as shown, to constitute a continuation of the housing, but may have some other form or configuration, while serving as an apparatus supporting member which may be rigidly connected to the housing yet readily disengaged therefrom.

The member 3 is preferably reenforced with a plurality of radial ribs such as 8 extending to the web 9 from which projects rearwardly two brackets 11 and 12. These brackets furnish a pivotal support for the reflector or light projector. Also extending rearwardly from the web 9 of the frame member 3 are a pair of brackets 13 and 13'.

Pivotally supported on a vertical axis between the brackets 11 and 12 at 11' and 12' is an annulus 14 which provides a pivotal support about a horizontal axis for the reflector 15.

Preferably the reflector is made of the usual thin material and has an inner reflecting surface, the reflector being secured at its open end in any suitable manner to an annular frame 16. For example, a clamping ring 17 and screws 18 may be employed for this purpose. Extending rearwardly from the frame 16 is a pair of ears on opposite sides such as 19 and 19' which are pivotally secured to the annulus 14 at 10 and 10' and from that point extend further rearwardly and inwardly toward each other in the form of arms such as 21 and 22.

The arms 21 and 22 may be separate or integral, as desired, but when separated, as shown, are clamped together by means of bolts such as 23 and in this instance may be employed to grip between their enlarged ends 24 and 25 either the base of the lamp bulb 20, the bulb socket or the electrical connections associated therewith. Thus if the arms 21 and 22 clamp the lamp bulb base or socket the bulb may be accurately located in the reflector without being directly attached thereto. If it be desired that a socket for the lamp be connected directly to the reflector, the arms 21 and 22 will support the electrical connections which furnish a current to the lamp and thus in the gyrations of the reflector no strains will be imposed on it by the electrical cables such as 26.

The reflector and the means for mounting it for both horizontal and vertical movement having been described, I will now describe the mechanism for imparting these two pivotal movements to the reflector. Supported on the rear ends of the brackets 13 and 13' by means of the cap screws such as 27 are a pair of arms 28 and 29 on which a motor 31 is firmly supported. The shaft of this motor is vertical and at the lower end of the motor housing there will be provided a train of reduction gears (not shown) which will reduce the speed of a rotating head 32 to any particular speed desired. A ball 33 carried by a slide member 34 which may be fixed in any position of eccentricity with relation to the axis of rotation of the head 32 is connected to a pitman rod 35, the forward end of which rod is pivotally connected at 36 to an arm 37 integrally formed with the ring 14. Reciprocatory motion of the pitman rod 35 resulting from its eccentric position with the rotating head 32 will impart oscillatory motion to the ring 14. The extent of this oscillation may be varied by varying the eccentricity of the position of the ball 33. The pitman rod is preferably variable in length for the purpose of adjustment, it being shown as comprising two sections which may be secured together by the bolt 38. However, some other form of pitman rod adjustable in length may be employed.

The upper end of the shaft of the motor is connected to another train of speed reducing gears (not shown) which will drive a head 39 to which is pivotally connected in an eccentric position in any suitable manner an upper pitman rod 41, this rod being likewise adjustable in length as shown at its middle portion 42. The forward end of this pitman rod is pivotally connected to a yoke 43 integral with the frame 16, it being preferable that the axis of the pivotal connection between the yoke and the pitman rod be in alignment with the pivotal axis of the ring 14 when the rings 14 and 16 are parallel. The eccentric connection of the upper pitman rod 41 with the head 39 will therefore impart a tilting of the reflector about the horizontal axis while the reciprocation of the lower pitman rod 35 will turn the reflector to the left and right about a vertical axis.

By varying the amount of eccentricity of the point of connection of each pitman rod to the shaft which drives it and by varying the lengths of the pitman rods themselves, one can cause the path of the light beam to assume different configurations, including arcs, straight lines and figure 8's. For most purposes it will be satisfactory to have the light beam follow a path similar to a figure 8 wherein the centers of the two loops lie in a horizontal plane and the path crosses itself at a point directly ahead of the locomotive or other vehicle. Thus this point may be focused on the track ahead and by proper adjustments of the pitman rods caused to strike the track at any desired distance in front of the locomotive. Also the sweep of the beam laterally of the track and upwardly into the air may be varied to suit different operating requirements on different railroads, without necessitating special designs and construction for each such different requirement.

In order that the device may be opened up for inspection and servicing, I have made provision whereby the apparatus while normally tightly sealed against the weather can very conveniently be made accessible. The rear section 1 of the casing which is bolted to the intermediate section 2 by a plurality of bolts such as 44 is provided at its rear end with a pair of bosses such as 45 into which are threaded or otherwise secured a pair of sleeves 46 which extend outwardly until they pass through upstanding brackets 47 integral with the bottom of the casing 2. Collars 48 serve to lock these sleeves in position and at the same time provide a bearing for the rods 49 connected with the pistons 51, which latter slide in the sleeves. To the outer ends of the rods 49 is secured the frame member 3 in any suitable manner so that when the frame member 3 is pulled outwardly, as shown in Fig. 3, the entire mechanism for operating the reflector will be supported slidably on the two rods 49. The apparatus when in retracted position is securely held by means of a plurality of stud bolts 52 which are threaded through lugs 53 integral with the casing 2 and which pass through holes 54 provided in the web 9 of the frame 3. When so secured, a packing ring 55 seals the juncture of the frame and casing.

The casing is provided with legs 56 and 57 which may be used to secure the headlight to the locomotive or other vehicle in any desired manner.

The lens is preferably hinged to the frame 3 to facilitate access to the nuts 58 on the studs 52. Brackets 59 integral with the frame 3 and brackets 61 integral with the lens retaining collar 6 are connected together in hinged relation by hinge pintles 62. By removing either of these pintles the lens may be swung to open position hinging on the other pintle, and the nuts 58 may then easily be reached. The lens collar 6 is preferably held tightly against frame 3 by a plurality of bolts 7' which may be screwed into place by hand.

Hence, by swinging the lens open, the nuts 58 may be reached and removed and the operating unit slid out of the casing. Any ordinary servicing such as replacement of the light bulb, lubrication and adjustments, if any, may be taken care of while the apparatus is thus exposed without removing the device from the locomotive. Should it be desired, however, to remove the mechanism from the locomotive, this can be done conveniently by unscrewing the collars 48 which will permit the pistons to be withdrawn and the entire operating mechanism to be taken down off the locomotive. The convenience of these provisions for inspection and servicing will be appreciated when it is realized that in many installations the light will be placed immediately in front of the smoke stack and its base or casing will be securely bolted to the top of the front end section of the boiler.

The reflector 15 is preferably made of thin material and provided with the usual inner reflecting surface. It is important to protect this thin reflector from distortion during its rapid gyrations, hence it is attached at its rim to the heavier annular frame 16, while the lamp base, socket, or electrical connections are preferably supported on the rigid arms 21 and 22. In any event, no strain is imposed on the thin reflector and its focus and the shape of the beam will not vary during prolonged use. This reflector and its associated light bulb is termed herein as the light beam projector.

Ordinarily the casing will be mounted rather permanently on the locomotive, but all the moving operating parts are so designed and supported that they may be removed quickly from the casing as a unit and replaced by an entirely new set of apparatus when quick servicing is required. Also the unit can be adjusted and focused while out of the casing and inserted thereinto ready to operate.

While I have shown and described in considerable detail a preferred form of the invention, it will be obvious that various other modifications in the details of construction may be made without departing from the spirit and scope of the invention described in the following claims.

I claim:

1. A headlight constructed for projecting a generally horizontal beam comprising a casing open at one end, an annular member and means for removably securing the same at said open end, a reflector and means for pivotally supporting the same on said member for pivotal movement about two axes at right angles to each other, a motor and connections therefrom to the reflector mounting means for oscillating the latter about its pivotal axis, and means carried by said member for supporting said motor within the casing rearwardly of said reflector, the main body of said reflector being positioned forwardly of its two axes of movement and connected to its pivotal support through its rim portion only.

2. A headlight constructed for projecting a generally horizontal beam comprising a casing open at one end and means for mounting the same securely upon a locomotive, an annular member and means for removably securing the same at said open end, a reflector and means for pivotally supporting the same on said member for pivotal movement about two axes at right angles to each other, a motor and connections therefrom to the reflector mounting means for oscillating the latter about its pivotal axis, and means carried by said member for supporting said motor within the casing rearwardly of said reflector, the main body of said reflector being positioned forwardly of its two axes of movement and connected to its pivotal support through its rim portion only.

3. A headlight constructed for projecting a generally horizontal beam comprising a casing having an open front end and otherwise closed, means for mounting the casing securely upon a vehicle, an annular member and means for removably securing the same to the casing at said open end, a lens and a lens retaining collar cooperating with said member and said casing for closing and sealing said front end, a reflector pivotally mounted on said member, an electric motor carried by said member and supported rearwardly of the reflector, and driving means connected with the motor and reflector for oscillating the latter about its pivotal axis, the main body of said reflector being positioned forwardly of its two axes of movement and connected to its pivotal support through its rim portion only.

4. In a headlight constructed for projecting a generally horizontal beam having a pivotally mounted reflector and a motor for oscillating the same, means for mounting said reflector comprising a rigid annular frame secured to the large open end of the reflector, an annulus located rearwardly of said open end for pivotally supporting said frame for oscillation about a horizontal axis, means for pivotally supporting said annulus for oscillation about a vertical axis, means mounting said motor rearwardly of the reflector, and means including gears connected with the motor shaft and said frame and similar means connected with the annulus for oscillating the reflector about both axes, the main body of said reflector being positioned forwardly of its two axes of movement and connected to its pivotal support through its rim portion only.

5. In a headlight constructed for projecting a generally horizontal beam having a pivotally mounted reflector and a motor for oscillating the same, means for mounting said reflector comprising a rigid annular frame secured to the large open end of the reflector, an annulus located rearwardly of said open end for pivotally supporting said frame for oscillation about a horizontal axis, means for pivotally supporting said annulus for oscillation about a vertical axis, means mounting said motor rearwardly of the reflector with its shaft parallel to one of said axes, and means including gears connected with the motor shaft and said frame and similar means connected with the annulus for oscillating the reflector about both axes, the main body of said reflector being positioned forwardly of its two axes of movement and connected to its pivotal support through its rim portion only.

6. In a headlight constructed for projecting a generally horizontal beam having a pivotally mounted reflector and a motor for oscillating the same, means for mounting said reflector comprising a rigid annular frame secured to the large open end of the reflector, an annulus located rearwardly of said open end for pivotally supporting said frame for oscillation about a horizontal axis, means for pivotally supporting said annulus for oscillation about a vertical axis, means mounting said motor rearwardly of the reflector with its shaft parallel to one of said axes, and means including gears connected with the motor shaft and said frame and similar means connected with the annulus for oscillating the reflector about both axes, the oscillating means connected with the frame and with the annulus respectively being connected to opposite ends of said motor shaft, the main body of said reflector being positioned forwardly of its two axes of movement and connected to its pivotal support through its rim portion only.

7. In a headlight constructed for projecting a generally horizontal beam having a pivotally mounted reflector and a motor for oscillating the same, means for mounting said reflector comprising a rigid annular frame secured to the large open end of the reflector, an annulus located rearwardly of said open end for pivotally supporting said frame for oscillation about a horizontal axis, means for pivotally supporting said annulus for oscillation about a vertical axis, means for mounting said motor rearwardly of the reflector, means including gears connected with the motor shaft and said frame and similar means connected with the annulus for oscillating the reflector about both axes, a lamp positioned within said reflector, and means rigidly connected with said frame for supporting the cable ends and lamp terminals immovably relatively to said reflector, the main body of said reflector being positioned forwardly of its two axes of movement and connected to its pivotal support through its rim portion only.

8. A headlight constructed for projecting a generally horizontal beam comprising a casing open at one end, an annular member and means concealed within the casing for securing the same at said open end, a reflector and means for pivotally supporting the same on said member for pivotal movement about two axes at right angles to each other, a motor and connections therefrom to the reflector mounting means for oscillating the latter about its pivotal axis, and means for supporting said motor on said member within the casing rearwardly of said reflector, the main body of said reflector being positioned forwardly of its two axes of movement and connected to its pivotal support through its rim portion only.

9. A headlight constructed for projecting a generally horizontal beam comprising a casing having an open front end and otherwise closed, means for mounting the casing securely upon a vehicle, an annular member and means for removably securing the same to the casing at said open end, a lens and a lens retaining collar cooperating with said member and said casing for closing and sealing said front end, a reflector pivotally mounted on said member, an electric motor carried by said member and supported rearwardly of the reflector, and driving means connected with the motor and reflector for oscillating the latter about its pivotal axis, the securing means for said member being concealed within the casing when the headlight is assembled and closed and being positioned for access when the lens retaining collar is swung to open position, the main body of said reflector being positioned forwardly of its two axes of movement and connected to its pivotal support through its rim portion only.

JEREMIAH D. KENNELLY.